(12) United States Patent
Piemontesi et al.

(10) Patent No.: US 9,676,883 B2
(45) Date of Patent: Jun. 13, 2017

(54) RANDOM PROPYLENE-ETHYLENE COPOLYMERS AND PROCESS FOR THEIR PREPARATION

(71) Applicant: BASELL POLIOLEFINE ITALIA S.R.L., Milan (IT)

(72) Inventors: Fabrizio Piemontesi, Ferrara (IT); Caroline Cathelin, Ferrara (FR); Simona Guidotti, Ferrara (IT); Dario Liguori, Ferrara (IT); Giampiero Morini, Ferrara (IT); Davide Tartari, Ferrara (IT); Gianni Vitale, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 15/309,042

(22) PCT Filed: May 6, 2015

(86) PCT No.: PCT/EP2015/059919
§ 371 (c)(1),
(2) Date: Nov. 4, 2016

(87) PCT Pub. No.: WO2015/169831
PCT Pub. Date: Nov. 12, 2015

(65) Prior Publication Data
US 2017/0073444 A1 Mar. 16, 2017

(30) Foreign Application Priority Data
May 6, 2014 (EP) .................................... 14167178

(51) Int. Cl.
*C08L 23/00* (2006.01)
*C08F 2/00* (2006.01)
*C08F 210/00* (2006.01)
*C08F 210/06* (2006.01)

(52) U.S. Cl.
CPC .................................. *C08F 210/06* (2013.01)

(58) Field of Classification Search
CPC .. C08F 210/06; C08F 210/16; C08F 2500/04; C08F 2500/12; C08F 2500/26
USPC .................................. 526/65, 348; 525/240
See application file for complete search history.

(56) References Cited

U.S. PATENT DOCUMENTS

2009/0270560 A1* 10/2009 Bacci .................... C08F 210/06
525/240

FOREIGN PATENT DOCUMENTS

EP 1903070 A1 3/2008

OTHER PUBLICATIONS

PCT International Search Report and the Written Opinion—Mailed Aug. 4, 2015 (Aug. 4, 2015) for Corresponding PCT/EP2015/059919.

* cited by examiner

*Primary Examiner* — William Cheung

(57) ABSTRACT

The present disclosure relates to propylene-ethylene copolymers comprising an ethylene content of 0.1-10% by weight, a molecular weight distribution (MWD), expressed in terms of Mw/Mn, of greater than 3.0 and a xylene soluble (XS) fraction content defined by values that fall below the line given by the equation $XS=1.0296 \cdot e^{0.435C_2}$. The propylene-ethylene copolymers advantageously exhibit high transparency and low melting temperatures.

15 Claims, No Drawings

RANDOM PROPYLENE-ETHYLENE COPOLYMERS AND PROCESS FOR THEIR PREPARATION

This application is the U.S. National Phase of PCT International Application PCT/EP2015/059919, filed May 6, 2015, claiming benefit of priority to European Patent Application No. 14167178.4, filed May 6, 2014, the contents of which are incorporated herein by reference in its entirety.

FIELD OF THE INVENTION

The present disclosure relates to propylene/ethylene copolymers which have excellent properties such as a low content of xylene-solubles and an advantageous melting temperature. Moreover, the disclosure also relates to a process for the preparation of copolymers of propylene with ethylene optionally comprising additional $\alpha$-olefins.

BACKGROUND OF THE INVENTION

Propylene copolymers containing from 0.1 to 10% by weight of ethylene and/or another alpha-olefin, in which the comonomer is randomly distributed in the polypropylene chain, are known as random propylene copolymers. Compared with propylene homopolymers, random propylene copolymers have a molecular structure which is modified by the presence of the comonomer, leading to a substantially lower degree of crystallinity. As a result, random propylene copolymers often have a lower melting temperature, lower sealing temperature and lower modulus of elasticity versus propylene homopolymers.

In general, lowering the total polymer crystallinity leads to a more homogenous structure in which the variation of refraction indices among the various polymer portions is minimized. The transparency of articles obtained from random copolymers is therefore increased with respect to that of the corresponding propylene homopolymers.

These characteristics make random propylene copolymers useful in the preparation of films or articles in which improved haze, impact resistance and low sealing initiation temperatures (S.I.T.) are required.

As a downside, the introduction of the comonomer into the polypropylene chain to form a random propylene copolymer leads to a significant increase in the fraction of the polymer being soluble in xylene at 25° C., with the soluble polymer portion primarily composed of lower molecular weight chains containing percentages of comonomer which are higher than the average content of comonomer in the whole polymer. The amount of soluble fraction generally increases as the average content of comonomer in the copolymer increases and, beyond defined limits, precludes the use of the copolymers in certain commercial applications, for example in the preparation of films for wrapping food, unless reduction or elimination of the soluble fraction occurs. The presence of relevant amounts of the xylene soluble fractions decreases the flowability of the polymer granules, thereby making operations such as discharging and transferring the polymer difficult and giving rise to operation problems in the polymerization plant and may leads, over the time, to the deterioration of the optical properties of the composition due to migration of these fractions to the surface (known as "blooming").

A catalyst capable of producing low levels of soluble fractions and capable of distributing the comonomer satisfactorily in the polypropylene chain to obtain the desired effect with the lowest possible comonomer content is therefore desirable. Moreover, the catalyst should produce a copolymer with low levels of catalytic residues (Ti<15 ppm) to make additional removal stage(s) unnecessary.

It is known in the art that random propylene copolymers with improved comonomer distribution are obtainable using single-site catalysts such as those described in EP Pat. Doc. No. EP-A-318,049 and WIPO Pat. App. Pub. No WO 03/040201. These catalysts are capable of producing random propylene copolymers having a low content of xylene solubles, low melting temperatures and improved optics. However, the copolymers obtained from single site catalysts often have a very narrow molecular weight distribution, which makes them difficult to process using standard techniques and process apparati that are designed to process broader molecular weight distribution polymers such as those produced with heterogeneous Ziegler-Natta (Z-N) catalysts. Moreover, the molecular weight of the copolymers is typically low (as indicated by their relatively high melt flow index (MFI) values) and not suitable for certain applications.

However, titanium based, heterogenous Z-N catalysts generally do not randomly distribute the comonomer in and among the polymeric chains effectively, diminishing the quality of the resulting random propylene copolymers by lowering the melting such that the amount of comonomer needed makes the xylene soluble fraction undesirably high.

Some improvements in random propylene copolymer production have been described, for example, in U.S. Pat. No. 6,365,685, which relates to propylene random copolymers obtained by using a phthalate based catalyst in combination with certain 1,3-diethers as external electron donors. The random propylene polymers described therein are improved with respect to those obtained with the same phthalate-based Z-N catalysts used in combination with silanes as external electron donors. However, the properties of the random copolymers still need to be improved particularly as the xylene solubles content reported in the patent is determined by a method which comprises disadvantageously dissolving the whole sample at the boiling point of xylene, lowering the temperature of the solution to 0° C. and then let the temperature raise up to 25° C.

This method normally detects a lower amount of xylene soluble fraction with respect to the more commonly used method in which a xylene boiling solution is brought to 25° C. without lowering it to 0° C. This latter method is more challenging but is the most suitable to test the polymer's performances in terms of xylene soluble content.

SUMMARY OF THE INVENTION

The present disclosure relates to propylene/ethylene copolymers, obtained using heterogeneous catalysts, having very improved comonomer distribution which allows for low sealing initiation temperatures and better transparency.

In some embodiments, the propylene copolymers comprise:
- an ethylene content of between 0.1 and 10% by weight;
- a molecular weight distribution (MWD), expressed in terms of Mw/Mn, greater than 3;
- a melt flow rate (MFR, 230° C. 2.16 kg) from 0.2 to 45 g/10 min;
- an absence of 2,1 propylene insertions;
- a xylene soluble fraction (XS) content and ethylene content (C2) such that the point defined by said values falls below the line given by the equation:

$$XS = 1.0296 \cdot e^{0.435 C2}$$

where:

XS=% by weight of the fraction soluble in xylene at 25° C. as determined according to the method given in the characterization section; and C2=% by weight of ethylene units in the copolymer as determined via NMR according to the method given in the characterization section.

DETAILED DESCRIPTION OF THE INVENTION

In some embodiments, the content of xylene soluble fraction (XS) and ethylene content (C2) of a copolymer in accordance with the present disclosure are such that the point defined by the resulting values falls below the line given by the equation:

$$XS = 0.969 \cdot e^{0.435 C2}$$

where XS and C2 have the same meaning specified above.

In one embodiment the molecular weight distribution (MWD), expressed in terms of Mw/Mn, is greater than 3.5, such as from 3.5 to 5.5.

In certain embodiments, the ethylene content of the copolymers is from 0.1-8% wt., from 0.1-6% wt., from 0.1-5% wt. and from 1 and 5.0% wt.

In further embodiments, the amount of catalytic residues is less than 10, less than 5 and less than 2 ppm of Ti.

Generally, the product of the comonomer reactivity ratio $r_1 \cdot r_2$ ranges from 1.5 and 3, such as from 1.8 to 3.

In additional embodiments, the melt flow rate (MFR, 230° C., 2.16 kg) of the reactor grade copolymers (i.e., copolymers that have not been subject to chemical or physical visbreaking) ranges from 0.5 to 45 g/10 min, including from 0.2 to 25/10 min.

Moreover, the copolymers disclosed herein can be characterized by one or more additional following features such as an absence of 2,1 propylene insertions, and a content of propylene units in the form of isotactic triads (mm %) as determined via $^{13}C$ NMR of higher than 98.3%, such as higher than 98.5%

As shown in the specific examples, the optical characteristics of the random copolymers (in a non-nucleated form) are beneficial as evidenced, in part, by the observable haze value, which is in general lower than 40 as an absolute value when determined on disk specimen 1 mm thick. In some embodiments, when the determination is carried out on film specimen of 50 μm the haze results to be lower than 0.30% and lower than 0.25.

The melting temperature depends on the ethylene content but typically ranges from 125° C. to 150° C., such as from 130 to 148° C. The SIT (Sealing Initiation Temperature) of the film obtained from the copolymer of the disclosure is also dependent on the comonomer content and may range, in certain embodiments, from 105 to 130° C., including from 110 to 128° C. and from 115 to 125° C. Moreover, the difference between the melting temperature and SIT for the copolymers of the disclosure may be higher than 20° C., including higher than 21° C., which is an indication of a broad processability window of the copolymers of the present disclosure.

The disclosed propylene copolymers can be prepared by a process comprising polymerizing propylene with ethylene in the presence of a catalyst comprising the product of the reaction between:

(i) a solid catalyst component comprising Ti, Mg, Cl, and an electron donor compound comprising from 0.1 to 50% wt. of bismuth (Bi) with respect to the total weight of the solid catalyst component;

(ii) an alkylaluminum compound and, (iii) an electron-donor compound (as an external donor).

In some embodiments, the content of Bi in the catalyst component ranges from 0.5 to 40% wt., such as from 1 to 35% wt., from 2 to 25% wt and from 2 to 20% wt.

The solid component particles of the present disclosure have substantially spherical morphologies and an average diameter, in some embodiments, ranging between 5 and 150 including from 20 to 100 μm and from 30 to 90 As defined herein, a "substantially spherical morphology" is defined as the ratio between the greater axis and the smaller axis being equal to or lower than 1.5, such as lower than 1.3.

In some embodiments, the amount of Mg ranges from 8 to 30% wt., such as from 10 to 25% wt.

In further embodiments, the amount of Ti ranges from 0.5 to 5% wt., such as from 0.7 to 3% wt.

Internal electron donor compounds for use in the present disclosure may be selected from alkyl and aryl esters of optionally substituted, aromatic polycarboxylic acids such as esters of benzoic and phthalic acids. Specific examples of such esters include n-butylphthalate, diisobutylphthalate, di-n-octylphthalate, ethyl-benzoate and p-ethoxy ethyl-benzoate.

In some embodiments, the Mg/Ti molar ratio is equal to, or higher than 13, such as in the range of 14 to 40 and 15 to 40. Correspondingly, in certain embodiments the Mg/donor molar ratio is higher than 16, higher than 17 and ranging from 18 to 50.

The Bi atoms may derive from one or more Bi compounds not having Bi-carbon bonds. In some embodiments, the Bi compounds can be selected from Bi halides, Bi carbonate, Bi acetate, Bi nitrate, Bi oxide, Bi sulfate and Bi sulfide. In further embodiments, compounds in which Bi has the valence $^{+}3$ are used, including Bi halides such as Bi trichloride and Bi tribromide.

The preparation of the solid catalyst component can be carried out according to several methods.

According to one method, the solid catalyst component can be prepared by reacting a titanium compound of the formula $Ti(OR)_{q-y}X_y$, where q is the valence of titanium and y is a number between 1 and q, such as $TiCl_4$, with a magnesium chloride deriving from an adduct of formula $MgCl_2 \cdot pROH$, where p is a number between 0.1 and 6, including from 2 to 3.5, and R is a hydrocarbon radical having 1-18 carbon atoms. The adduct can be prepared in spherical form by mixing alcohol and magnesium chloride under stirring conditions at the melting temperature of the adduct (about 100-130° C.). The adduct is then mixed with an inert hydrocarbon that is immiscible with the adduct, thereby creating an emulsion that is quickly quenched, causing the solidification of the adduct into spherical particles. Examples of spherical adducts prepared according to this procedure are described in U.S. Pat. Nos. 4,399,054 and 4,469,648. The adduct can be directly reacted with a Ti compound or it can be subjected to thermal controlled dealcoholation (80-130° C.) to produce an adduct in which the number of moles of alcohol is, in some embodiments, lower than 3, such as between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The electron donor compound can be added in the desired ratio(s) during the treatment with $TiCl_4$.

Several methods are known for adding one or more Bi compounds during the catalyst preparation. According to one option, Bi compound(s) is/are incorporated directly into the $MgCl_2 \cdot pROH$ adduct during its preparation. In addition, the Bi compound can be added at the initial stage of adduct preparation by mixing it with $MgCl_2$ and the alcohol. Alternatively, it can be added to the molten adduct before the emulsification step. The amount of Bi introduced ranges from 0.1 to 1 mole per mole of Mg in the adduct. Bi compound(s) that may be incorporated directly into the $MgCl_2 \cdot pROH$ adduct are Bi halides such as $BiCl_3$.

The alkyl-Al compound (ii) may be chosen from among the trialkyl aluminum compounds; for example, triethylaluminum, triisobutylaluminum, tri-n-butylaluminum, tri-n-hexylaluminum, and tri-n-octylaluminum may be used. It is also possible to use alkylaluminum halides, alkylaluminum hydrides and alkylaluminum sesquichlorides, such as $AlEt_2Cl$ and $Al_2Et_3Cl_3$, optionally in mixture with the trialkylaluminums disclosed herein. The Al/Ti ratio, in some embodiments, is higher than 1, such as between 50 and 2000.

One class of external donors useful to prepare the copolymers of the present disclosure includes the silicon compounds of the formula $(R_6)_a(R_7)_bSi(OR_8)_c$, where a is 1, b is 1, c is 2, at least one of $R_6$ and $R_7$ is selected from branched alkyl, cycloalkyl or aryl groups with 3-10 carbon atoms optionally containing heteroatoms and $R_8$ is a $C_1$-$C_{10}$ alkyl group, such as a methyl group. Silicon compounds for use in the present technology include dicyclopentyldimethoxysilane (D donor) and methylcyclohexyldimethoxysilane (C donor), which may optionally be used in combination with a gas-phase polymerization technique.

In some embodiments, the external electron donor compound (iii) is used in a molar ratio between the organoaluminum compound and the electron donor compound (iii) of from 0.1 to 500, such as from 1 to 300 and from 3 to 100.

The polymerization process can be carried out according to known techniques, for example, slurry polymerization using an inert hydrocarbon solvent as a diluent, or bulk polymerization using a liquid monomer (for example, propylene) as a reaction medium. Moreover, it is possible to carry out the polymerization process in gas-phase operating in one or more fluidized- or mechanically-agitated bed reactors.

The polymerization may be carried out at temperatures from 20 to 120° C., such as from 40 to 90 and from 40 to 80° C. In some embodiments, when the polymerization is carried out in gas-phase the operating pressure is between 0.5 and 10 MPa, and between 1 and 8 MPa. In bulk polymerizations, in some embodiments the operating pressure is between 1 and 8 MPa, including between 1.5 and 5 MPa. Hydrogen may be used as a molecular weight regulator.

According to one embodiment, the propylene copolymers of the present disclosure can be prepared with a gas-phase polymerization process carried out in at least two interconnected polymerization zones as described in WIPO Pat. App. Pub. Nos. WO 97/04015 and WO 00/02929.

In some embodiments, the process is carried out in a first and a second interconnected polymerization zone, into which propylene and ethylene or propylene and alpha-olefins are fed in the presence of a catalyst system and from which the resulting polymer is discharged. In certain embodiments, the growing polymer particles flow through the first of the polymerization zones (riser) under fast fluidization conditions, exit the first polymerization zone and enter the second polymerization zone (downcomer), through which they flow in a densified form under the action of gravity, leave the second polymerization zone and are reintroduced into the first polymerization zone for establishing a circulation of polymers between the two polymerization zones. Generally, the conditions of fast fluidization in the first polymerization zone is established by feeding the monomer gas mixture below the point of reintroduction of the growing polymer into the first polymerization zone. The velocity of the transport gas into the first polymerization zone is higher than the transport velocity under the operating conditions and is normally between 2 and 15 m/s. In the second polymerization zone, where the polymer flows in densified form under the action of gravity, the solid may exhibit high density values which approach the bulk density of the polymer. A positive gain in pressure can be obtained along the direction of flow so that it becomes possible to reintroduce the polymer into the first reaction zone without the help of mechanical means. In this way, a "loop" circulation is set up, which is defined by the balance of pressures between the two polymerization zones and by the head loss introduced into the system. Optionally, one or more inert gases, such as nitrogen or an aliphatic hydrocarbon, are maintained in the polymerization zones, in such quantities that the sum of the partial pressures of the inert gases is between 5 and 80% of the total pressure of the gases. The operating parameters such as the temperature are those known to the skilled artisan for gas-phase olefin polymerization processes, for example between 50° C. and 120° C. The process can be carried out under operating pressure of between 0.5 and 10 MPa, preferably between 1.5 and 6 MPa. In some embodiments, the various catalyst components are fed to the first polymerization zone at any point of the first polymerization zone. However, they can also be fed at any point of the second polymerization zone. Molecular weight regulators known in the art, such as hydrogen, can be used to regulate the molecular weight of the growing polymer.

The propylene copolymer used for the preparation of the films of the present disclosure may further comprise additives commonly employed in the relevant art, such as antioxidants, light stabilizers, nucleating agents, antiacids, colorants and fillers.

As explained, propylene-ethylene random copolymers of the present disclosure are characterized by a lower amount of xylene soluble fraction with respect to the propylene-ethylene random copolymers having the same ethylene content but generated with a catalyst not containing Bi. They may also be characterized by a low melting temperature and medium molecular weight distribution, which allow for enhanced processability. Random propylene copolymers having the characteristics described above are particularly suitable for the preparation of low seal initiation temperature and high clarity films for use, e.g. in the packaging field.

The following examples are given to better illustrate the disclosure and are not intended to limit it in any way.

EXAMPLES

Characterizations

Determination of Mg, Ti

The determination of Mg and Ti content in the solid catalyst component is carried out via inductively coupled plasma (ICP) emission spectroscopy on an "I.C.P Spectrometer ARL Accuris".

The sample was prepared by analytically weighting, in a "Fluxy" platinum crucible", 0.1-0.3 grams of catalyst and 2 grams of lithium metaborate/tetraborate 1/1 mixture. After the addition of some drops of potassium iodide (KI) solution, the crucible is inserted in a special apparatus "Claisse Fluxy" for burning. The residue is collected with a 5% v/v HNO$_3$ solution and then analyzed via ICP at the following wavelengths: magnesium, 279.08 nm; titanium, 368.52 nm.

Determination of Bi

The determination of Bi content in the solid catalyst component is carried out via inductively coupled plasma (ICP) emission spectroscopy on an "I.C.P Spectrometer ARL Accuris".

The sample was prepared by analytically weighting 0.1-0.3 grams of catalyst in a 200 cm$^3$ volumetric flask. After slow addition of about 10 milliliters of 65% v/v HNO$_3$ solution and about 50 cm$^3$ of distilled water, the sample undergoes digestion for 4-6 hours, after which the volumetric flask is diluted to the 200 cm$^3$ mark with deionized water. The resulting solution is directly analyzed via ICP at the following wavelength: bismuth, 223.06 nm.

Determination of Internal Donor Content

The determination of the content of internal donor in the solid catalytic compound was done using gas chromatography (GC). The solid component was dissolved in acetone, an internal standard was added, and a sample of the organic phase was analyzed in a gas chromatograph to determine the amount of donor present at the starting catalyst compound.

Determination of X.I.

The xylene soluble (XS) fraction was measured according to ASTM ISO 16152(2005), but with the following deviations (the bracketed values represent what is prescribed by ASTM ISO 16152)

i—The solution volume is 250 ml (200 ml);
ii—During the precipitation stage at 25° C. for 30 min, the solution, for the final 10 minutes, is kept under agitation by a magnetic stirrer (30 min, without stirring); and
iii—The final drying step is done under vacuum at 70° C. (100° C.).

The content of the xylene soluble fraction is expressed as a percentage of the original 2.5 grams and then, by difference (complementary to 100), the xylene insoluble percentage (X.I. %).

Molecular Weight Distribution ($M_w/M_n$)

Molecular weights and molecular weight distributions were measured at 150° C. using a Waters Alliance GPCV/2000 instrument equipped with four mixed-bed columns (PLgel Olexis) having particle sizes of 13 μm. The dimensions of the columns were 300×7.8 mm. The mobile phase was vacuum distilled 1,2,4-trichlorobenzene (TCB) and the flow rate was kept at 1.0 ml/min. The sample solution was prepared by heating the sample under stirring at 150° C. in TCB for one to two hours. The concentration was 1 mg/ml. To prevent degradation, 0.1 g/l of 2,6-di-tert-butyl-p-cresol was added. 300 μl of solution were injected into the column set. A calibration curve was obtained using 10 polystyrene standard samples (EasiCal kit by Agilent) with molecular weights in the range from 580 to 7,500,000. The assumed K values of the Mark-Houwink relationship were:

$K=1.21\times10^{-4}$ dl/g and $\alpha=0.706$ for the polystyrene standards, $K=1.90\times10^{-4}$ dl/g and $\alpha=0.725$ for the experimental samples.

A third-order polynomial fit was used to interpolate the experimental data and obtain the calibration curve. Data acquisition and processing was done by using Waters Empowers 3 Chromatography Data Software with a gas phase chromatography (GPC) option.

Melt Flow Rate (MIL)

The melt flow rate (MIL) of the polymer was determined according to ASTM ISO 1133 (230° C., 2.16 kg).

$^{13}$C NMR of Propylene/Ethylene Copolymers $^{13}$C NMR spectra were acquired on a Bruker AV-600 spectrometer equipped with cryoprobe, operating at 160.91 MHz in Fourier transform (FT) mode at 120° C.

The peak of the $S_{\beta\beta}$ carbon (nomenclature according to "Monomer Sequence Distribution in Ethylene-Propylene Rubber Measured by $^{13}$C NMR. 3. Use of Reaction Probability Mode," C. J. Carman, R. A. Harrington and C. E. Wilkes, *Macromolecules*, 1977, 10, 536) was used as an internal reference at 29.9 ppm. The samples were dissolved in 1,1,2,2-tetrachloroethane-d2 at 120° C. with a 8% w/v concentration. Each spectrum was acquired with a 90° pulse and 15 seconds of delay between pulses and composite pulse decoupling (CPD) to remove $^1$H-$^{13}$C coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride," M. Kakugo, Y. Naito, K. Mizunuma and T. Miyatake, *Macromolecules*, 1982, 15, 1150) using the following equations:

$$PPP=100T_{\beta\beta}/S \quad PPE=100T_{\beta\delta}/S \quad EPE=100T_{\delta\delta}/S$$

$$PEP=100S_{\beta\beta}/S \quad PEE=100S_{\beta\delta}/S \quad EEE=100(0.25S_{\gamma\delta}+0.5S_{\delta\delta})/S$$

$$S=T_{\beta\beta}+T_{\beta\delta}+T_{\delta\delta}+S_{\beta\beta}+S_{\beta\delta}+0.25S_{\gamma\delta}+0.5S_{\delta\delta}$$

The molar percentage of ethylene content was evaluated using the following equation:

$E$ % mol=100*[$PEP+PEE+EEE$]. The weight percentage of ethylene content was evaluated using the following equation:

$$E\text{ \% wt.} = \frac{100*E\text{ \% mol}*MW_E}{E\text{ \% mol }*MW_E+P\text{ \% mol}*MW_P}$$

where P % mol is the molar percentage of propylene content and $MW_E$ and $MW_P$ are the molecular weights of ethylene and propylene, respectively.

The product of reactivity ratio $r_1r_2$ was calculated according to Carman (C. J. Carman, R. A. Harrington and C. E. Wilkes, Macromolecules, 1977; 10, 536):

$$r_1r_2 = 1 + \left(\frac{EEE+PEE}{PEP}+1\right) - \left(\frac{P}{E}+1\right)\left(\frac{EEE+PEE}{PEP}+1\right)^{0.5}$$

The tacticity of propylene sequences was calculated as mm content from the ratio of the PPP mmT$_{\beta\beta}$ (28.90-29.65 ppm) and the whole T$_{\beta\beta}$ (29.80-28.37 ppm).

Determination of the Regioinvertions:

Determined by means of $^{13}$C-NMR according to the methodology described by J.C. Randall in "Polymer sequence determination Carbon013 NMR method", (Academic Press, 1977). The content of regioinvertions is calculated on the basis of the relative concentration of $S_{\alpha\beta}+S_{\beta\beta}$ methylene sequences.

Melting Temperature Via Differential Scanning Calorimetry (DSC)

The melting points of the polymers ($T_m$) were measured by differential scanning calorimetry (DSC) on a Perkin Elmer DSC-1 calorimeter previously calibrated against indium melting points, and according to ASTM ISO 11357-1, 2009 and 11357-3 (2011) at 20° C./min. The weight of the samples in every DSC crucible was kept at 6.0±0.5 mg.

In order to obtain the melting point, the sample was sealed into aluminum pans and heated to 200° C. at a rate of 20° C./minute. The sample was kept at 200° C. for 2 minutes to allow a complete melting of all the crystallites, then cooled to 5° C. at 20° C./minute. After standing 2 minutes at 5° C., the sample was heated for the second run time to 200° C. at 20° C./min. In the second heating run, the peak temperature ($T_{p,m}$) was taken as the melting temperature.

Determination of Haze on Disk Specimen

Haze was measured on an injection molded circle plaque (disk; 1 mm thick and 50 mm in diameter) by using a Gardner HazeGard Plus hazemeter, according to the method prescribed in ASTM D 1003-07.

The disk specimens were produced by using an injection molding machine (BOY Model XS), equipped with a 16 mm diameter screw. The following molding conditions were applied:

| | |
|---|---|
| Melt temperature | 230° C. |
| Mold Temperature | 40° C. |
| Screw RPM | 120 |
| Injection time | 1 s |
| Back pressure | 12 Bar |
| Total Cycle time | 30 s |
| Injection Pressure | Maximum possible without flashing (90-120 Bar, depending on the sample) |
| Hold pressure | 15 bar less than the injection pressure (i.e. 75-105 Bar) |
| Hold time | 20 s |

Seal Initiation Temperature (SIT)

Preparation of the Film Specimens

Films with a thickness of 50 μm were prepared by extruding each test composition in a single screw Collin extruder (length/diameter ratio of screw 1:25) at a film drawing speed of 7 m/min and a melt temperature of 210-250° C. Each resulting film is superimposed on a 1000 μm thick film of a propylene homopolymer having a xylene insoluble fraction of 97 wt % and an MFR L of 2 g/10 min. The superimposed films are bonded to each other in a Carver press at 200° C. under a 9000 kg load, which is maintained for 5 minutes. The resulting laminates are stretched longitudinally and transversally, i.e. biaxially, by a factor of 6 with a T.M. Long film stretcher at 150° C. to produce a 20 μm thick film (18 μm homopolymer+2 μm test). 2×5 cm specimens are then cut from the films.

Determination of the SIT

For each test, two of the above specimens are superimposed in alignment, with the adjacent layers being layers of the particular test composition. The superimposed specimens are sealed along one of the 2 cm sides with a Brugger Feinmechanik Sealer, Model HSG-ETK 745. The sealing time is 5 seconds at a pressure of 0.1 N/mm². The sealing temperature is increased by 2° C. for each seal, starting from about 10° C. less than the melting temperature of the test composition. The sealed samples are left to cool and then their unsealed ends are attached to an Instron machine, where they are tested at a traction speed of 50 mm/min.

The SIT is the minimum sealing temperature at which the seal does not break when a load of at least 2 Newtons is applied in the test conditions.

Determination of the Haze on Film

50 μm film specimens prepared as described above for the SIT measure were used. The haze value is measured using a Gardner photometric unit connected to a Hazemeter Type UX-10 having a GE 1209 light source with filter "C". Reference samples of known haze are used for calibrating the instrument.

Procedure for the Preparation of the Spherical Adduct

Microspheroidal $MgCl_2 \cdot pC_2H_5OH$ adduct was prepared according to the method described in Comparative Example 5 of WIPO Pat. App. Pub. No. WO98/44009, with the difference that $BiCl_3$ is in powder form and the amount indicated in Table 1 has been added before adding the oil.

Procedure for the Preparation of the Solid Catalyst Component

Into a 500 ml round bottom flask, equipped with mechanical stirrer, cooler and thermometer, 300 ml of $TiCl_4$ were introduced at room temperature under a nitrogen atmosphere. After cooling to 0° C. and while stirring, diisobutylphthalate and 9.0 g of the spherical adduct (prepared as described above) were sequentially added into the flask. The amount of internal donor added was such to produce a Mg/donor molar ratio of 8. The temperature was raised to 100° C. and maintained for 2 hours. Thereafter, stirring was stopped, the solid product was allowed to settle and the supernatant liquid was siphoned off at 100° C. After the supernatant was removed, additional fresh $TiCl_4$ was added to reach the initial liquid volume. The mixture was then heated at 120° C. and kept at this temperature for 1 hour. Stirring was stopped, the solid was allowed to settle and the supernatant liquid was siphoned off. The solid was washed with anhydrous hexane six times in a temperature gradient down to 60° C., and washed one time at room temperature. The resulting solid was then dried under vacuum and analyzed.

Propylene/Ethylene Copolymerization Examples 1-6 and Comparative Example 1

A 4-liter steel autoclave equipped with a stirrer, pressure gauge, thermometer, catalyst feeding system, monomer feeding lines and thermostatic jacket was purged with nitrogen at 70° C. for one hour. Then, at 30° C. under a 0.5 bar propylene stream, a suspension containing 75 ml of anhydrous hexane, 0.76 g of $AlEt_3$, 3.3 mmol of dicyclopentyldimethoxysilane (D donor), and 0.004-0.010 g of solid catalyst component, previously precontacted for 5 minutes, was charged. The autoclave was closed, and 3.2 N of hydrogen was added to produce the desired MIL, as reported in Table 1. Then, under stirring, 1.2 kg of liquid propylene and the required amount of ethylene (4 g) were fed while increasing the temperature from 30° C. to 70° C. The temperature of the system was raised to 70° C. in about 10-15 minutes, and the polymerization was carried out at this temperature for two hours. Ethylene was fed during the polymerization in order to keep the pressure constant. At the end of the polymerization, the non-reacted monomers were removed; the polymer was recovered and dried at 70° C. under vacuum for three hours. Then the polymer was weighed and characterized. Experimental data related to propylene/ethylene copolymerizations are reported in Table 1. All of the product copolymers lacked 2,1 regioinversion centers.

Comparative Examples 2-3

Propylene/ethylene copolymers of Examples 1 and 4 of U.S. Pat. No. 6,365,685, in which XS has been determined according to the method given in the referenced patent, were produced and used for comparative purposes.

Examples 7-8 and Comparative Example 4

Prepolymerization Treatment

Before introducing it into the polymerization reactors, the solid catalyst component prepared as described above was contacted with triethyl aluminum (TEAL) and methylcyclohexyldimethoxysilane (C donor) in a ratio as reported in Table 2. The resulting mixture was subjected to prepolymerization by maintaining it in suspension in liquid propylene at 20° C. for about 5 minutes before introducing it into the polymerization reactor.

Polymerization

Copolymer are prepared by polymerizing propylene and ethylene in the presence of the formed catalyst under continuous conditions in a plant comprising a polymerization apparatus as described in EP 1 012 195. The pre-polymerized catalyst is sent to the polymerization apparatus that comprises two interconnected cylindrical reactors, a riser and a downcomer. Fast fluidization conditions are established in the riser by recycling gas (propane) from the gas-solid separator. No barrier feed is used. The powder is continuously discharged and dried under a nitrogen flow. The main polymerization conditions are reported in Table 2. The characterization of the polymer is reported in Table 4. For all copolymers produced 2,1 regioinversion centers were absent.

The comparative example was carried out according to the same procedure with the only difference being that the catalyst component of Comparative Example 1 was used.

The copolymers, additivated with Irgafos 168 (0.09%), Irganox 1010 (0.045%) and Calcium Stearate (0.04%), were extruded into 50 μm films for characterization.

TABLE 1

| | Polymerization and Characterization | | | | | | | | |
|---|---|---|---|---|---|---|---|---|---|
| | Support Synthesis Bi/Mg % mol | Mileage Copoly-merization, tons/g Ti | MIL g/10, | XS % wt. | C2 % wt. | Tm2 ° C. | Mw/Mn | % mm | Haze |
| Ex 1 | 2.0 | 5.5 | 1.9 | 3.7 | 3.2 | 143.1 | 5.1 | 98.8 | nd |
| Ex. 2 | 5.0 | 14.9 | 1.2 | 2.9 | 3.0 | 145.4 | 5.0 | 98.6 | 32.8 |
| Ex. 3 | 10.0 | 10.5 | 1.7 | 2.1 | 2.5 | 146.8 | | 99.0 | nd |
| Ex. 4 | 15.0 | 11.3 | 1.3 | 1.6 | 2.2 | 146.6 | 4.7 | 98.9 | 35.5 |
| Ex. 5 | 25.0 | 11.4 | 1.4 | 3.9 | 3.2 | 141.4 | | 98.7 | nd |
| Ex. 6 | 3.5 | 13.6 | 4.9 | 7.1 | 4.7 | 133.6 | | 99.1 | 33.5 |
| Comp. 1 | — | 3.7 | 3.4 | 5.0 | 3.0 | 143.3 | 5.4 | 98.1 | 41.1 |
| Comp 2 | — | | 7.4 | 2.8 | 2.3 | 147.1 | | | nd |
| Comp 3 | — | | 1.0 | 14 | 6.0 | 128.7 | | | nd |

Nd = not determined

TABLE 2

| | | Example | | |
|---|---|---|---|---|
| | | Ex. 7 | Ex 8 | Comp. 4 |
| Catalyst feed | g/h | 10 | 10 | 10 |
| Catalyst/TEAL | g/g | 6 | 6 | 6 |
| TEAL/C donor | g/g | 5 | 3 | 3 |
| Polymerization temperature | ° C. | 75 | 70 | 70 |
| Pressure | Bar-g | 28 | 27 | 27 |
| $H_2/C_3^-$ | mol/mol | 0.019 | 0.031 | 0.029 |
| $C2^-/C2^- + C3^-$ | mol/mol | 0.023 | 0.028 | 0.028 |
| Residence time | min | 66 | 79 | 80 |

TABLE 3

| | | Example | | |
|---|---|---|---|---|
| | | 7 | 8 | Comp. 4 |
| MFR | g/10' | 13.2 | 9.3 | 8.1 |
| C2 | % | 3.0 | 4.0 | 4.1 |
| XS | % | 3.2 | 5.2 | 8.5 |
| $M_w/M_n$ | | 4.1 | 4.4 | 4.3 |
| Tm | ° C. | 144.1 | 139.1 | 138.7 |
| Characterization of Cast film (50 μm) | | | | |
| Haze | % | 0.19 | 0.14 | 0.30 |
| SIT | ° C. | 123 | 118 | 121 |

What is claimed is:

1. A propylene-ethylene copolymer comprising:
an ethylene content of 0.1 to less than 10% by weight;
a molecular weight distribution (MWD), expressed in terms of Mw/Mn, of greater than 3;
a melt flow rate (MFR 230° C. 2.16 kg) for the reactor grade copolymers of 0.5-45 g/10 min;
an absence of 2,1 propylene insertions;
a xylene soluble fraction (XS) content and an ethylene content (C2) defined by values that fall below the line given by the equation:

$$XS = 1.0296 \cdot e^{0.435C2}$$

where:
XS=% by weight of the fraction soluble in xylene at 25° C.; and
C2=% by weight of ethylene units in the copolymer determined via NMR.

2. The propylene/ethylene copolymer of claim 1 where the content of xylene soluble fraction (XS) and ethylene content (C2) of the copolymer are such that the point defined by the content values falls below the line given by the equation:

$$XS = 0.969 \cdot e^{0.435C2}$$

where XS=% by weight of the fraction soluble in xylene at 25° C.; and
C2=% by weight of ethylene units in the copolymer determined via NMR.

3. The propylene/ethylene copolymer of claim 1, where the ethylene content ranges from 0.1-5% wt.

4. The propylene/ethylene copolymer of claim 3, where the ethylene content ranges from 1-5% wt.

5. The propylene-ethylene copolymer of claim 1, where the catalytic residues comprise less than 5 ppm of Ti.

6. The propylene-ethylene copolymer of claim 1, where the product of the comonomer reactivity ratio r1·r2 ranges from 1.5-3.

7. The propylene-ethylene copolymer of claim 1, where the molecular weight distribution (MWD), as determined via gel permeation chromatography (GPC), is higher than 3.5.

8. The propylene-ethylene copolymer of claim 1, where the content of propylene units in the form of isotactic triads (mm %) as determined via $C^{13}$ NMR, is higher than 98.3%.

9. The propylene-ethylene copolymer of claim 1, wherein the melt flow rate (MFR, 230° C. 216 kg) of the reactor grade copolymers ranges from 0.2-45.

10. An article comprising the propylene-ethylene copolymer of claim 1.

11. A process for the preparation of the propylene-ethylene copolymer of claim 1, comprising polymerizing propylene with ethylene in the presence of a catalyst comprising the product of the reaction between:

(i) a solid catalyst component comprising Ti, Mg, Cl, and an internal electron donor compound comprising 0.1-50% wt. of Bi with respect to the total weight of the solid catalyst component;
(ii) an alkylaluminum compound and,
(iii) an external electron-donor compound.

12. The process of claim 2, where the external electron donor compound is selected from silicon compounds of the formula $(R_6)_a(R_7)_b Si(OR_8)_c$, where a is 1, b is 1, c is 2, at least one of $R_6$ and $R_7$ is selected from branched alkyl, cycloalkyl or aryl groups with 3-10 carbon atoms optionally containing heteroatoms and $R_8$ is a $C_1$-$C_{10}$ alkyl group.

13. The process of claim 11, where the internal electron donor compound is selected from alkyl and aryl esters of substituted aromatic polycarboxylic acids.

14. The process of claim 12, where the external electron donor compound is dicyclopentyldimethoxysilane.

15. The process of claim 11, where the process carried out in gas-phase in a reactor comprising at least two interconnected polymerization zones.

* * * * *

UNITED STATES PATENT AND TRADEMARK OFFICE
CERTIFICATE OF CORRECTION

PATENT NO. : 9,676,883 B2  
APPLICATION NO. : 15/309042  
DATED : June 13, 2017  
INVENTOR(S) : Fabrizio Piemontesi et al.

Page 1 of 1

It is certified that error appears in the above-identified patent and that said Letters Patent is hereby corrected as shown below:

On the Title Page

| | | |
|---|---|---|
| Column 2, (57) Abstract | Line 4 | Delete "Mw/Mn," and insert --$M_w/M_n$,-- |

In the Specification

| | | |
|---|---|---|
| Column 2 | Line 59 | Delete "Mw/Mn," and insert --$M_w/M_n$,-- |
| Column 3 | Line 22 | Delete "Mw/Mn," and insert --$M_w/M_n$,-- |
| Column 3 | Line 30 | Delete "r1·r2" and insert --$r_1 r_2$-- |
| Column 3 | Line 41 | After "98.5%", insert --.-- |
| Column 4 | Line 10 | Delete "150" and insert --150 µm,-- |
| Column 4 | Line 11 | Delete "90" and insert --90 µm.-- |
| Column 11 | Line 5 | In Table 1, delete "Mw/Mn" and insert --$M_w/M_n$,-- |

In the Claims

| | | |
|---|---|---|
| Column 12 | Line 20 | In Claim 1, delete "Mw/Mn," and insert --$M_w/M_n$,-- |
| Column 13 | Line 4 | In Claim 6, delete "r1·r2" and insert --$r_1 r_2$-- |
| Column 13 | Line 11 | In Claim 8, delete "$C^{13}$ NMR," and insert --$^{13}$C NMR,-- |
| Column 14 | Line 5 | In Claim 11, delete "compound and," and insert --compound; and-- |
| Column 14 | Line 7 | In Claim 12, delete "claim 2," and insert --claim 11,-- |

Signed and Sealed this  
Twenty-first Day of January, 2020

Andrei Iancu  
*Director of the United States Patent and Trademark Office*